UNITED STATES PATENT OFFICE.

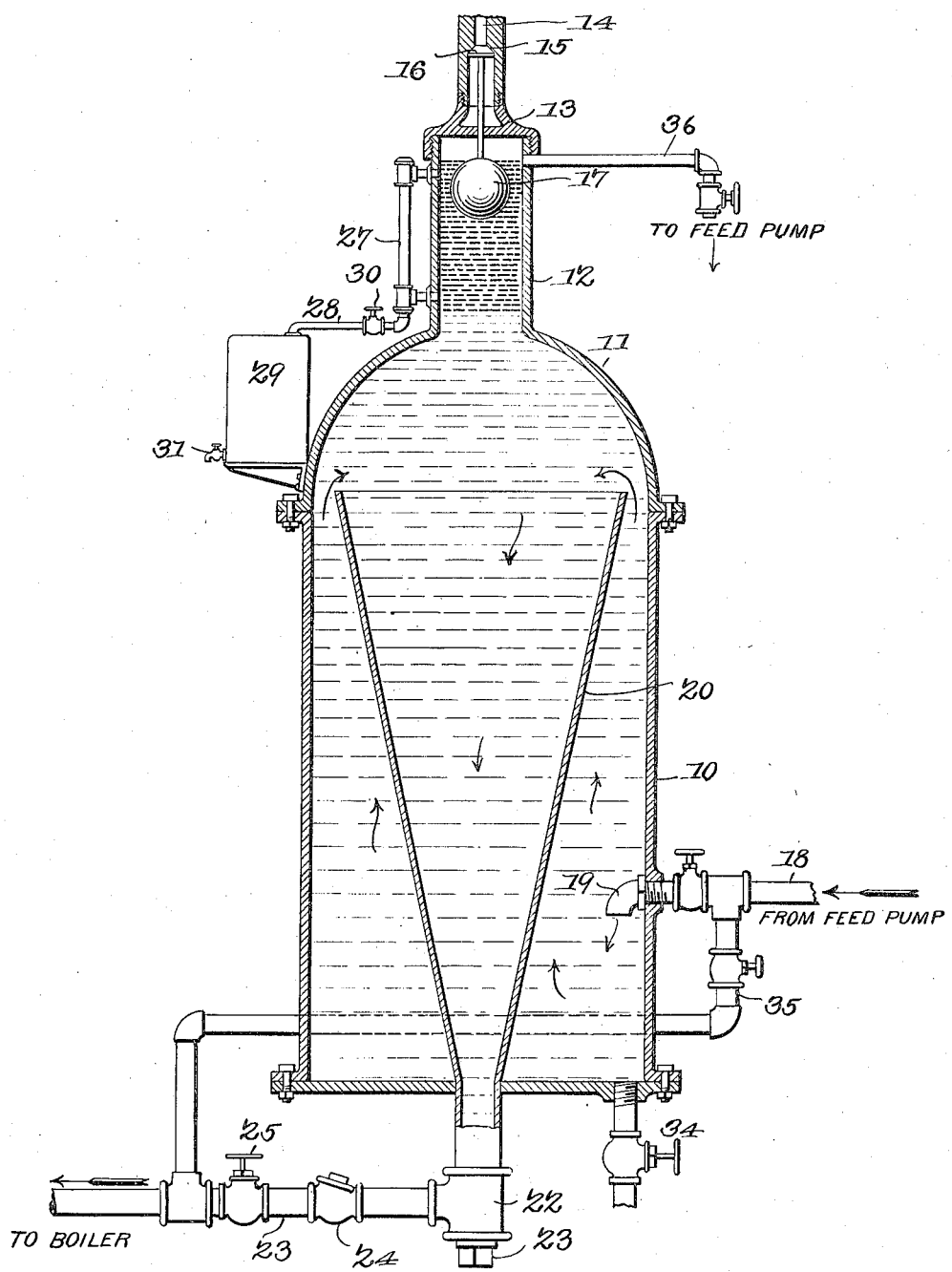

GEORGE R. DAVIDSON, OF LENOX, MICHIGAN.

OIL AND FEED-WATER SEPARATOR.

No. 812,831.　　　　Specification of Letters Patent.　　　　Patented Feb. 20, 1906.

Application filed March 9, 1905. Serial No. 249,292.

*To all whom it may concern:*

Be it known that I, GEORGE R. DAVIDSON, a citizen of the United States, residing at Lenox, in the county of Macomb and State of Michigan, have invented a new and useful Oil and Feed-Water Separator, of which the following is a specification.

This invention relates to devices of that class employed for the separation of oil and feed-water, and has for its principal object to provide a novel means for separating the oil from feed-water during the passage of the latter from the feed-pump to the boiler.

A further object of the invention is to construct a separator which may be connected in the pipe-line between the feed-pump and the boiler, the separator being of sufficient volume to contain a comparatively large quantity of water and by diminishing the force of the current permitting the oil to separate from the water by gravity, the oil accumulating in a chamber at the upper portion of the separator and being withdrawn from time to time as may become necessary.

A still further object of the invention is to provide a separator in which the current of water is forced to travel through a comparatively narrow annular space within a separating-chamber to permit the oil to readily separate therefrom, and, further, to provide a separating-chamber having a float-valve which at the beginning of operations will remain open to permit the escape of all air from the chamber and will remain closed so long as the latter is filled with liquid.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

The accompanying drawing illustrates in vertical section an oil-separator constructed in accordance with the invention.

The separator is formed of a preferably cylindrical casing 10, having a closed bottom and provided with an approximately dome-shaped cap united to the main casing by suitable bolts. The top of the cap is formed integral with a small cylindrical oil-chamber 12, the upper end of which is provided with a cap-piece 13, having an air-vent 14, and in said cap is a valve-seat 15 for the reception of a float-valve 16, that is connected to a suitable float 17.

The water from the feed-pump enters through a pipe 18 near the lower end of the casing 10, and at the inner end of the pipe is a downwardly-directed elbow or nozzle 19 in order that the current of water entering through the pipe may be forced downward toward the bottom of the chamber.

Within the casing 10 is a funnel-shaped casing 20, the upper and larger end of which is of such diameter that a contracted annular space is formed between the funnel and the inner wall of the casing for the passage of the water, so that the latter, being compelled to travel in a comparatively thin stream, will more readily yield up the oil which it carries, the oil separating from the water by gravity and moving upward to the smaller chamber 12 at the top of the dome-shaped cap 11. The lower contracted end of the casing 20 extends down through the bottom of the casing 10 and is coupled to a T 22, the lower end of which is closed by a plug 23, which may be removed when necessary to clean the casing 20 of any accumulations. From the T extends a pipe 23, leading to the boiler, and in said pipe is arranged a check-valve 24, which will close under boiler-pressure and prevent the outflow of water from the boiler to the separator. This pipe is also provided with a globe-valve 25, by which the flow of water from the separator to the boiler may be controlled.

To the oil-collecting chamber 12 is connected a sight-glass 27 of the construction usually employed on boilers, and to the lower coupling of the glass is connected a pipe 28, leading to an oil-tank 29 and provided with a suitable valve 30, which may be opened from time to time in order to draw off the oil which accumulates in the chamber 12. The tank is provided with a faucet or valve 31 for the removal of the contents.

In operation the water and oil from the feed-pump are directed downward by the elbow or nozzle 19 and thence pass upward through the gradually-contracted annular space between the chambers 10 and 20, and as the liquid must travel over the edge of the casing 20 in a comparatively thin stream ample opportunity is afforded for the escape of the oil, the latter floating upward to the chamber 12 while the water, under feed-pump pressure, passes downward through the casing 10 and out through the pipe 23 to the boiler.

In order to prevent the accumulation of the cylinder-oil on the walls of the casings 10 and 20, a small quantity of kerosene or similar material may be injected into the separator from time to time, and when necessary the blow-off cock 34 may be opened to remove the accumulations from the separator or to draw off all of its contents, and in any case direct communication between the feed and boiler may be established by a valved by-pass 35, thus permitting repairs to the separator in case of accident without stopping the supply of water to the boiler.

In introducing the kerosene the latter is preferably fed in minute quantities to the feed-pump and forced, together with the water, through the pipe 18 to the separator and in rising by gravity will come into contact with any cylinder-oil which may have accumulated on the inner wall of the separator and will free the same therefrom, so that the cylinder-oil and kerosene may float to the top. The kerosene being lightest will float on top of the cylinder-oil and may overflow through a pipe 36, leading to the feed-pump, in order that a continuous circulation of the kerosene may be maintained.

Having thus described the invention, what is claimed is—

1. In a device of the class specified, a casing connected between the feed-pump and the boiler, a submerged deflector by which the water is directed toward the upper end of the casing in a thin annular stream, a water-outlet at or near the bottom of the casing, and means at the top of the casing for drawing off the accumulated oil.

2. In a device of the class specified, a casing having an inlet at its lower portion for the liquid to be separated, a submerged conical deflector arranged within the casing and over the upper wider edge of which the liquid must pass, and a water-outlet leading from the lower portion of said deflector, and means at the top of the casing for drawing off accumulated oil.

3. The combination with a casing having at its lower portion a liquid-inlet, a submerged funnel-shaped deflector arranged within the casing and forcing the volume of fluid to travel in a thin annular stream between the upper wider mouth of the deflector and the inner wall of the casing, a water-outlet near the lower end of the deflector, an oil-chamber forming an extension of the main casing and to which the oil flows by gravity, and means for drawing off the oil from said chamber.

4. The combination with a casing having near its lower end an inlet for the liquid to be separated, said inlet having a downwardly-turned discharge-mouth, a submerged funnel-shaped deflector arranged within the casing and having its widened inlet-mouth near the upper portion of said casing, a water-discharge near the lower end of said deflector, an upper oil-chamber forming an extension of the main casing, and to which the oil flows by gravity, a sight-glass for determining the quantity of oil in said chamber, and means for drawing off said oil.

5. In a device of the class specified, a casing having at its upper end an air-vent, a float-valve for closing said air-vent, an inlet arranged near the lower portion of the casing for the entrance of the liquid to be separated, a submerged deflector having a widened entrance-mouth and a contracted discharge-opening, an oil-chamber arranged at the upper portion of the casing and through which the oil flows by gravity, and means for drawing off the oil from said chamber.

In testimony that I claim the foregoing as my own I have hereto affixed my signature in the presence of two witnesses.

GEORGE R. DAVIDSON.

Witnesses:
CHAS. SCHURKEY,
W. R. DAVIDSON.